United States Patent
Cesare

[19]

[11] Patent Number: 6,105,842
[45] Date of Patent: Aug. 22, 2000

[54] PICKUP TRUCK STORAGE BAG

[76] Inventor: James F. Cesare, 2128 Niskayuna Dr., Niskayuna, N.Y. 12309

[21] Appl. No.: 09/240,800

[22] Filed: Jan. 28, 1999

[51] Int. Cl.[7] .............................. B60R 9/00; B60R 13/01
[52] U.S. Cl. ...................... 224/404; 224/563; 224/572; 296/39.2; 296/100.16; 383/66; 383/97; 383/107
[58] Field of Search ...................................... 224/404, 563, 224/572, 318, 328; 383/66, 97, 107; 296/39.2, 100.18, 100.15, 100.16

[56] References Cited

U.S. PATENT DOCUMENTS

| | | | |
|---|---|---|---|
| 2,803,491 | 8/1957 | Brown | 296/39 |
| 4,260,091 | 4/1981 | French et al. | 224/311 |
| 4,718,583 | 1/1988 | Mullican | 224/404 |
| 4,828,312 | 5/1989 | Kinkel et al. | 296/37.6 |
| 5,096,107 | 3/1992 | Vanson | 224/328 |
| 5,366,124 | 11/1994 | Dearborn, IV | 224/404 |
| 5,378,034 | 1/1995 | Nelsen | 296/39.2 |
| 5,868,295 | 2/1999 | Carriere | 224/404 |

*Primary Examiner*—Linda J. Sholl
*Attorney, Agent, or Firm*—Brown, Pinnisi & Michaels, PC

[57] ABSTRACT

A storage bag for a pickup truck provides a convenient way for people to use the bed of their pickup truck to store possessions. The storage bag is in the shape of the truck bed. The bag is preferably lightweight and waterproof. The bag is constructed from one piece of nylon to help eliminate seams, which aids in weatherproofing. A zipper extends around the top surface of the bag to aid in the opening, closing, and packing of the bag. There is also a zippered flap on the end so that cargo can be stored or retrieved by opening the hinged gate of the truck bed. The bag optionally has waterproof pockets for smaller items. Grommets are provided on an upper surface of the bag for securing the bag to the truck with rope, bungee cords, or the like. The storage bag stands alone and retains its shape without the aid of the truck. When the storage bag is empty, it is easily collapsed and folded for storage.

7 Claims, 5 Drawing Sheets

PICKUP TRUCK STORAGE BAG

FIELD OF THE INVENTION

The invention pertains to the field of truck bed storage, and in particular, a storage bag for a pickup truck bed.

BACKGROUND OF THE INVENTION

Many drivers of pickup trucks appreciate and utilize the cargo space on the bed of the truck. The truck bed is often used as intended by transporting cargo to some destination. Small items and garments must often be placed on the bed of the truck due to a lack of room in the cab. During inclement weather, the use of the truck bed is inconvenient as it is exposed to the elements of the weather.

Remedies for this situation include a tarp, extended cab, tonneau, or some other covering for the bed that can be removed. Other options include cargo containers for truck beds or luggage racks. To ease in the transportation of cargo, the cargo container should be portable even with the cargo stored inside the container. The inventions of the prior art have done a good job in protecting the cargo from outside elements and from damage due to transporting on a vehicle. However, it is desirable to be able to remove the container stored with cargo from the truck bed for further transportation outside of the vehicle. The inventions of the prior art have not been able to combine all of the desired characteristics.

U.S. Pat. No. 5,378,034 (Nelsen) discloses a flexible cargo container for truck beds that is similar to the present invention.

U.S. Pat. No. 4,828,312 (Kinkel) discloses a collapsible security storage apparatus for truck beds. This device has two rigid panels that essentially form a top and bottom of the container. The top panel is hinged to the truck bed sidewalls, and the invention is collapsible because these hinges can be undone and the top panel allowed to rest with the bottom panel in the truck bed. A problem with this apparatus is that it doesn't have much storage space. The invention is not designed to use the entire bed of the truck, so only a few small objects can be stored. Also, the container is not designed so that it can be simultaneously moved with the cargo inside of it.

U.S. Pat. No. 2,803,491 (Brown) discloses a flexible bag for a trailer body. The purpose of the invention is to protect bulk transport items from the elements. The flexible container relies on necessary structural support from the trailer frame. This apparatus has two disadvantages. First, the cargo can only be accessed through the chute of the container. Second, the cargo and the container can't be removed simultaneously. The invention is not designed for a person wishing to store a few items in the back of his pickup truck.

U.S. Pat. No. 5,096,107 (VanSon) discloses a flexible container that protects luggage or other items that is carried on the roof of the sedan. The items carried in the container are protected from the elements and the device itself securely attaches to the roof rack of the vehicle. One embodiment of the invention provides for pockets or other storage areas within the rack. A disadvantage is that the container is not adapted for a truck bed and can't be simultaneously transported along with the cargo when the container is not attached to the roof rack.

Another disadvantage is the difficulty in storing the container when not in use. The container should have the ability to be easily stored or stowed away.

SUMMARY OF THE INVENTION

A storage bag for a pickup truck provides a convenient way for people to use the bed of their pickup truck to store possessions. The storage bag is in the shape of the truck bed. The bag is preferably lightweight and waterproof. Preferably, the bag is constructed from one piece of nylon to help eliminate seams, which aids in weatherproofing. A zipper extends around the top surface of the bag to aid in the opening, closing, and packing of the bag. There is also a zippered flap on the end so that cargo can be stored or retrieved by opening the hinged gate of the truck bed. The bag optionally has waterproof pockets for smaller items. Grommets are provided on an upper surface of the bag for securing the bag to the truck with rope, bungee cords, or the like. The storage bag stands alone and retains its shape without the aid of the truck. When the storage bag is empty, it is easily collapsed and folded for storage.

DESCRIPTION OF THE PREFERRED EMBODIMENT

Figure 1:
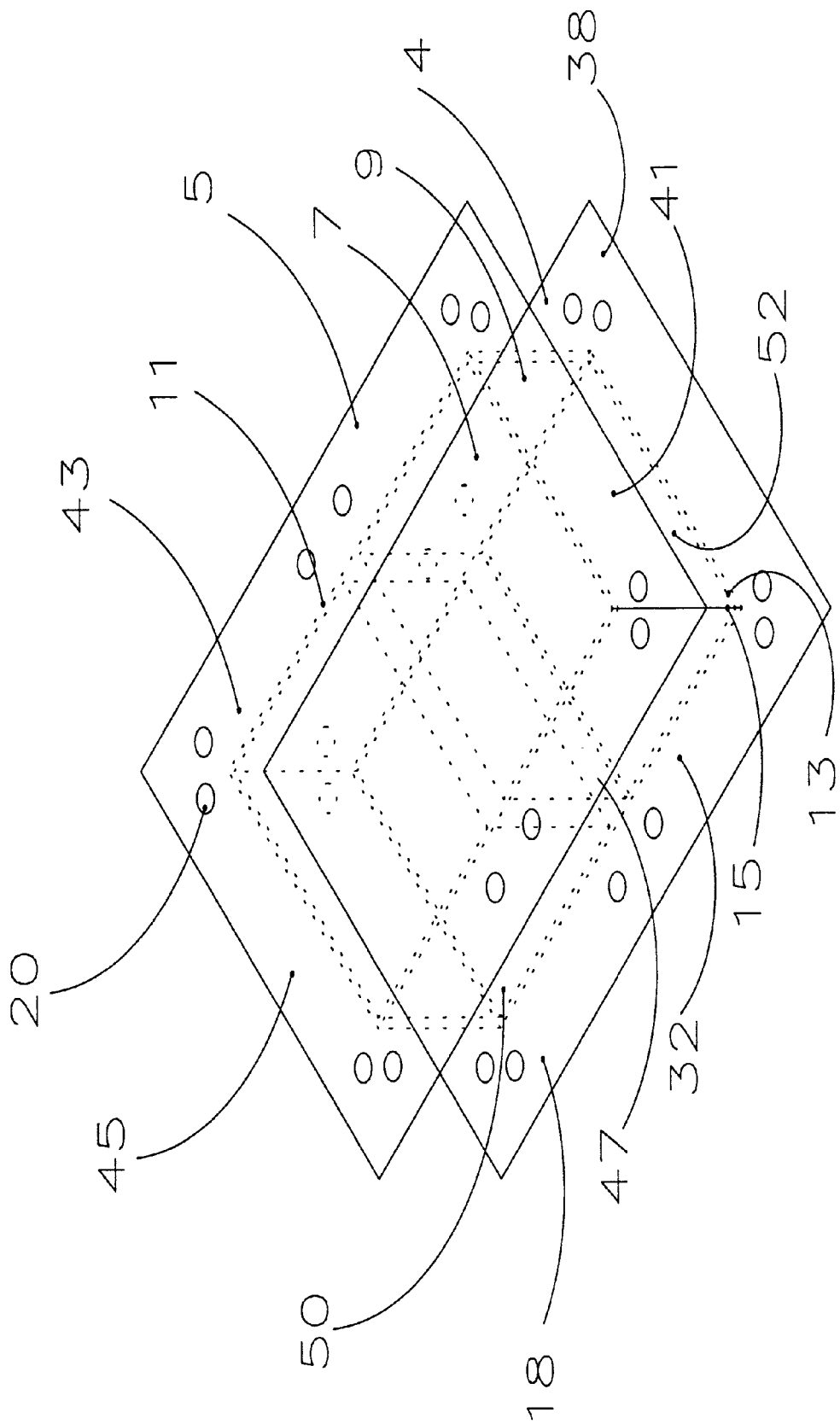
FIG. 1 shows a pickup truck storage bag in the closed position.

Referring to FIG. 1, a pickup truck storage bag 2 for a pickup truck fits in the bed of the truck behind the cab. Storage bag 2 is made from a lightweight material 6. Material 6 is preferably heavy duty and water-resistant. Storage bag 2 is made from a single-piece of material 6 so that there are fewer seams. Fewer seams leads to better water resistance and less tension in material 6 of storage bag 2. Material 6 is preferably a heavy duty nylon or canvas material impermeable to water or other liquids. When storage bag 2 is empty, it can be folded so that it no longer takes up the volume of the truck bed, but rather can be stored in a much smaller area.

Figure 2:
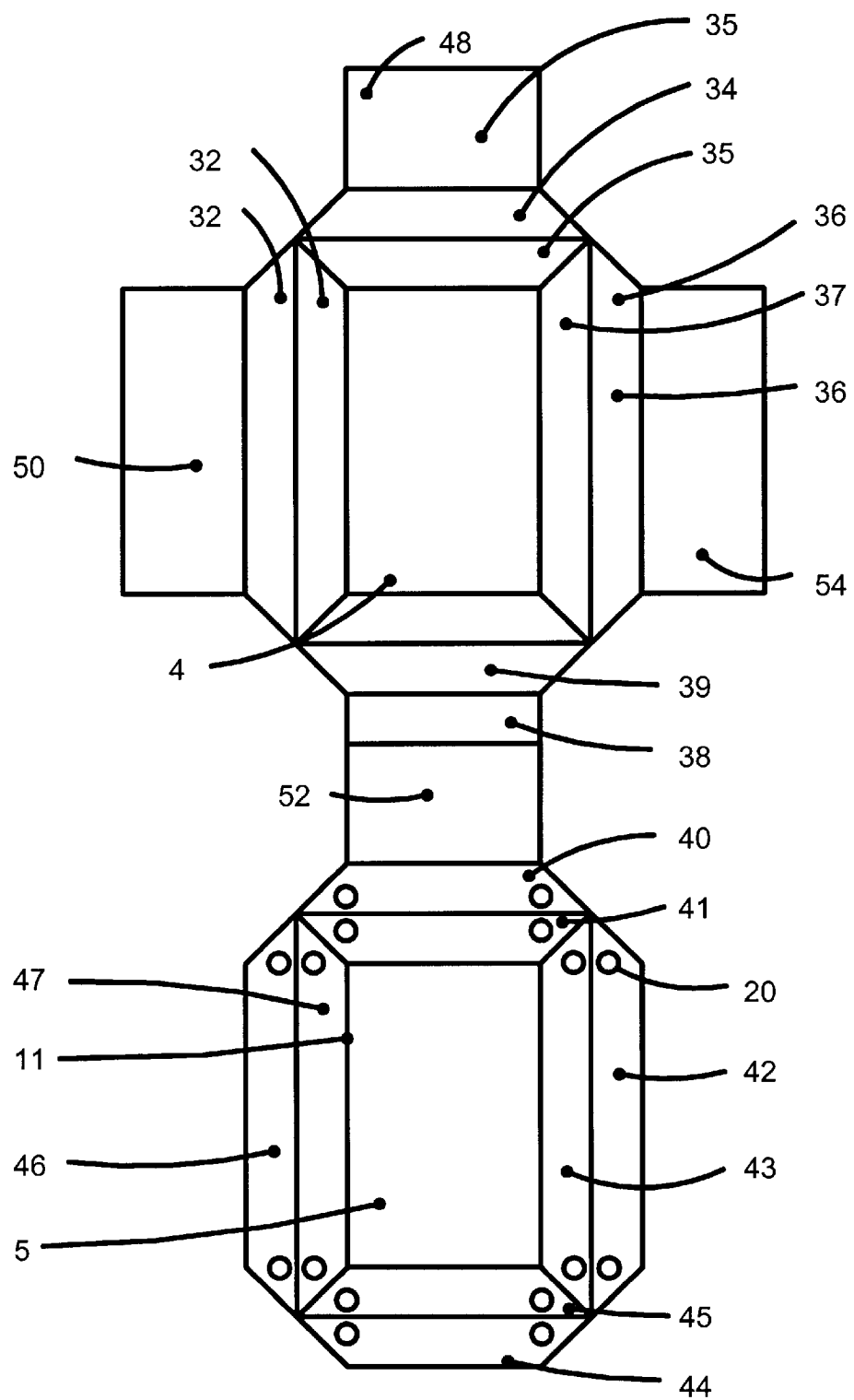
FIG. 2 shows the preferred shape of the material of the pickup truck storage bag.

Referring to FIG. 2, a base 4 has a first section 33, a second section 35, a third section 37, and a fourth section 39, all around the perimeter of base 4. Each section has a corresponding piece of material that is folded over to form a lower lip 18. Base 4 and lower lip 18 are shaped to fit a truck bed, preferably being rectangular. A section 32 folds over section 33. A section 34 folds over section 35. A section 36 folds over section 37. A section 38 folds over section 39. Four side panels 48, 50, 52, and 54 fold upwards to form the walls of storage bag 2. A seam 15 attaches side panels 48, 50, 52, and 54 to each other. Attached to side panel 52 is what forms top 5 to storage bag 2. An upper lip 16 is formed by inner sections 41, 43, 45, and 47 being folded over their counterparts, sections 40, 42, 44, and 46. Upper lip 16 and lower lip 18 preferably extend a few inches beyond side panels 48, 50, 52, and 54. Side panels 48, 50, 52, and 54, are sewn to the edge where a top 5 meets sections 41, 43, 45, and 47, to form storage bag 2.

Upper lip 16 has a plurality of grommets 20 near the corners of upper lip 16. Grommets 20 are optionally used to secure storage bag 2 to the truck bed using rope, bungee cords, or the like. If section 41, 43, 45, or 47, have grommet 20, then the corresponding section 40, 42, 44, or 46, respectively, must have grommet 20 to allow the rope or bungee cord to pass through upper edging 16. Grommets 20 can be optionally placed along upper edging 16 but the closer grommet 20 is to a corner of top 5, the less tension there will be.

Top 5 has a top flap 7, which is a portion of top 5 that is fastened with a top flap zipper 11, preferably of a heavy duty nylon. Side panel 52 has a side flap 9. Side flap 9 is a convenience for those who would like to open the gate on the truck bed to access storage bag 2 and just slide in the cargo into a vertical opening that will be exposed to less precipitation than top flap 7. Side flap 9 is fastened with a side flap zipper 13. Storage bag 2 is considered in a closed position when zipper 11 and zipper 13 are completely fastened. When storage bag 2 is in a closed position, it is impermeable to rain and other such elements.

Figure 3:
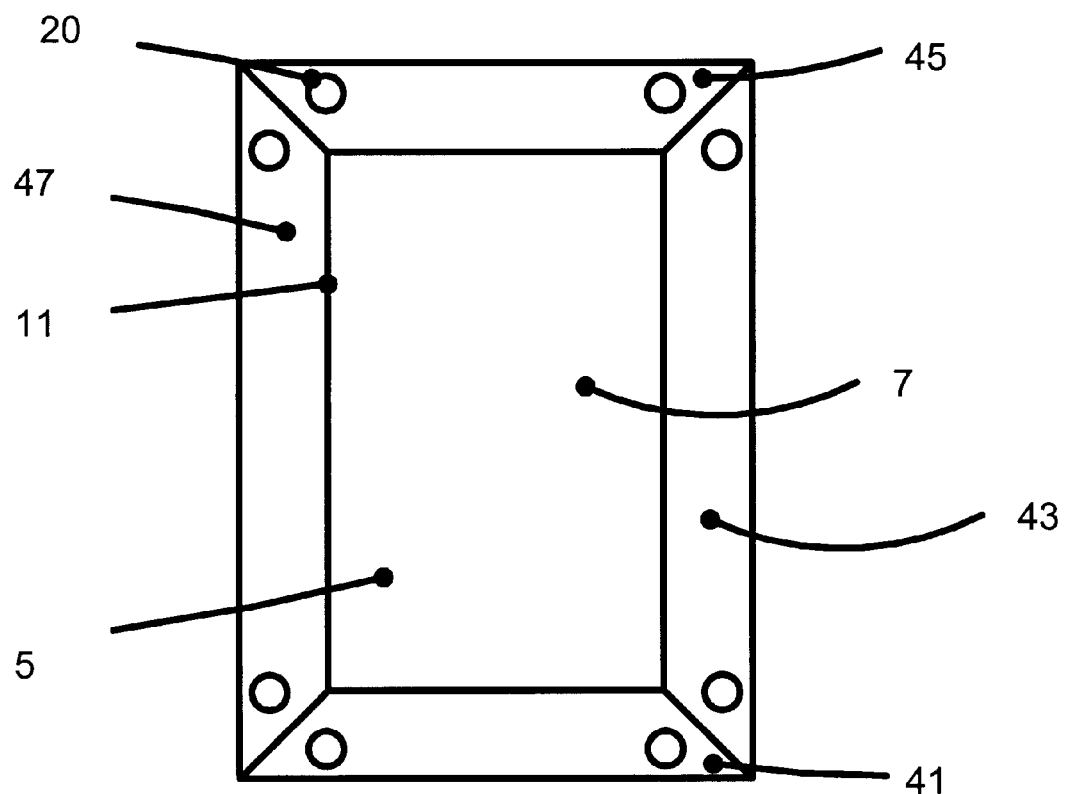
FIG. 3 shows the top view of the pickup truck storage bag.

Referring to FIG. 3, the top view of storage bag 2, grommets 20 are placed at the corners of the bag to reduce tension when using zipper 11. Top flap 7 uses most of the surface of top 5.

Figure 4:
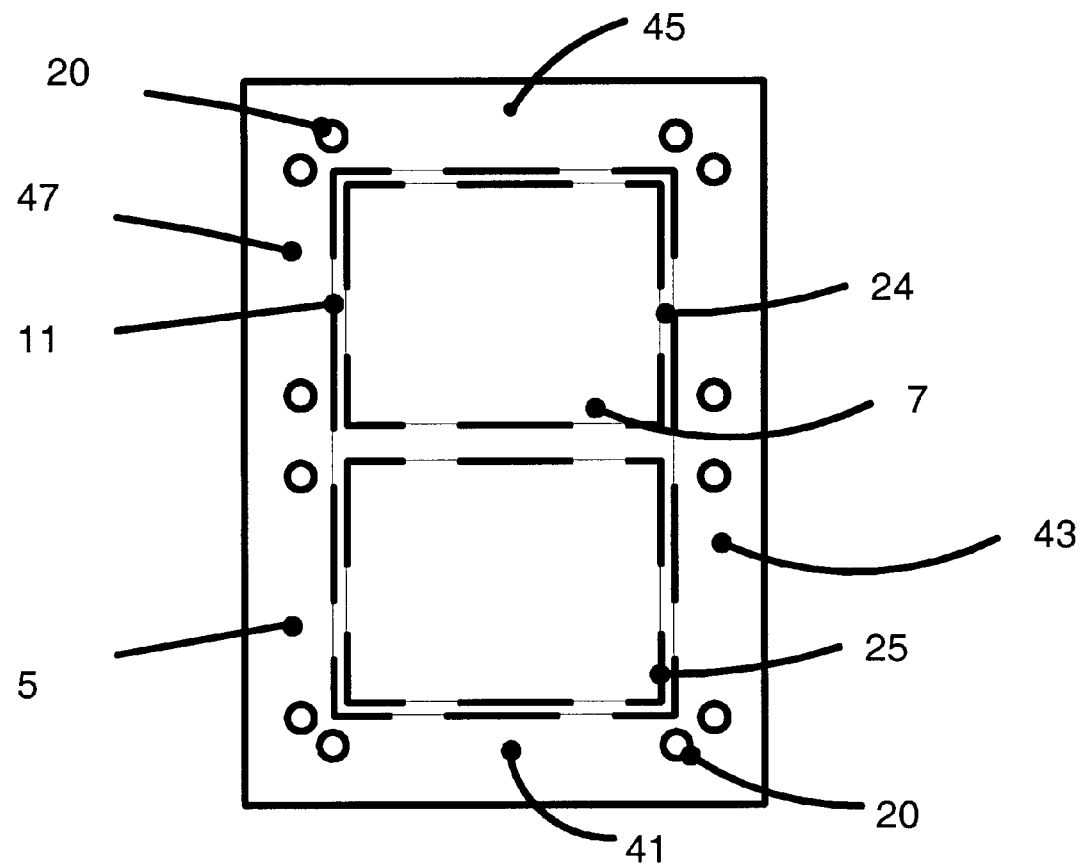
FIG. 4 shows another embodiment of the invention from the top view.

Referring to FIG. 4, another embodiment of the invention, a zipper 24 and a zipper 25 are added to top flap 7. Zippers 24 and 25 give access to storage bag 2 without having to open the entire top flap 7. This is convenient if the weather is unfavorable or if the other half of storage bag 2 is already packed. Zipper 11 can still be used to access a larger area of storage bag 2. Grommets 20 are added to help reduce stress in storage bag 2 when fastening zippers 24 and 25.

Figure 5:
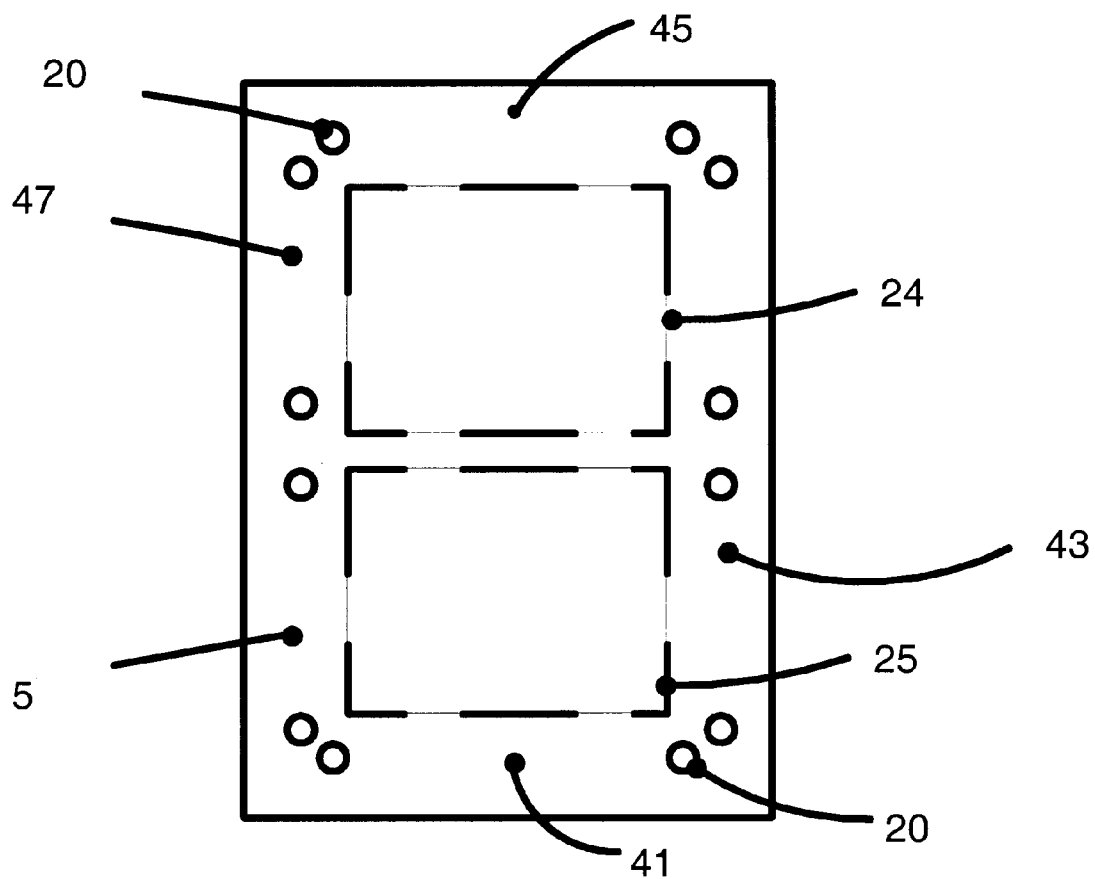
FIG. 5 shows yet another embodiment of the invention from the top view.

In another embodiment of the invention shown in FIG. 5, zipper 11 was removed and top flap 7 is now broken into two separate halves. Grommets 20 must remain to help to lessen the stress forces.

Storage bag 2 is optionally equipped with pockets (not shown) and rigid inserts (not shown) for structure in the corners of storage bag 2.

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

What is claimed is:

1. A storage bag for use in a pickup truck bed comprising:
   a single piece of a lightweight waterproof foldable material;
   said storage bag having a compartment formed by a base, four walls and a top, of said single-piece of said material, wherein said base and said top are the same size and are in the shape of a truck bed;
   a lower lip of said base formed by folding a portion of said material between said base and each of said walls to form said lower lip and sewing a bottom edge seam where each of said walls adjoin said base;
   an upper lip on said top formed by folding said material between each of said walls and said top to form said upper lip and sewing a top edge seam where each of said walls adjoin said top;
   a top flap covering most of said top, wherein said top flap is fastened closed and said compartment is waterproofed by a top flap zipper;
   an end flap on at least one wall wherein said end flap is fastened closed and said compartment is waterproofed by an end flap zipper; and
   a plurality of grommets along said top edge located near the corners of said top flap.

2. A storage bag for use in a truck bed according to claim 1, wherein said top flap has a plurality of smaller flaps within said top flap.

3. A storage bag for use in a truck bed according to claim 1, wherein said storage bag has at least one rigid insert to provide structure in at least one corner of said storage bag.

4. A storage bag for use in a pickup truck bed comprising:
   a single piece of a lightweight waterproof foldable material;
   said storage bag having a compartment formed by a base, four walls and a top, of said single-piece of said material, wherein said base and said top are the same size and are in the shape of a truck bed;
   a lower lip of said base formed by folding a portion of said material between said base and each of said walls to form said lower lip and sewing a bottom edge seam where each of said walls adjoin said base;
   an upper lip on said top formed by folding said material between each of said walls and said top to form said upper lip and sewing a top edge seam where each of said walls adjoin said top;
   a top flap covering most of said top, wherein said top flap is fastened closed and said compartment is waterproofed by a top flap zipper; and
   a plurality of grommets along said top edge located near the corners of said top flap.

5. A storage bag for use in a truck bed according to claim 4, further comprising an end flap on at least one wall wherein said end flap is fastened closed and said compartment is waterproofed by an end flap zipper.

6. A storage bag for use in a truck bed according to claim 4, wherein said top flap has a plurality of smaller flaps within said top flap.

7. A storage bag for use in a truck bed according to claim 4, wherein said storage bag has at least one rigid insert to provide structure in at least one corner of said storage bag.

* * * * *